INVENTORS F. K. BECKER
D. M. P. EISENLOHR
BY
ATTORNEY

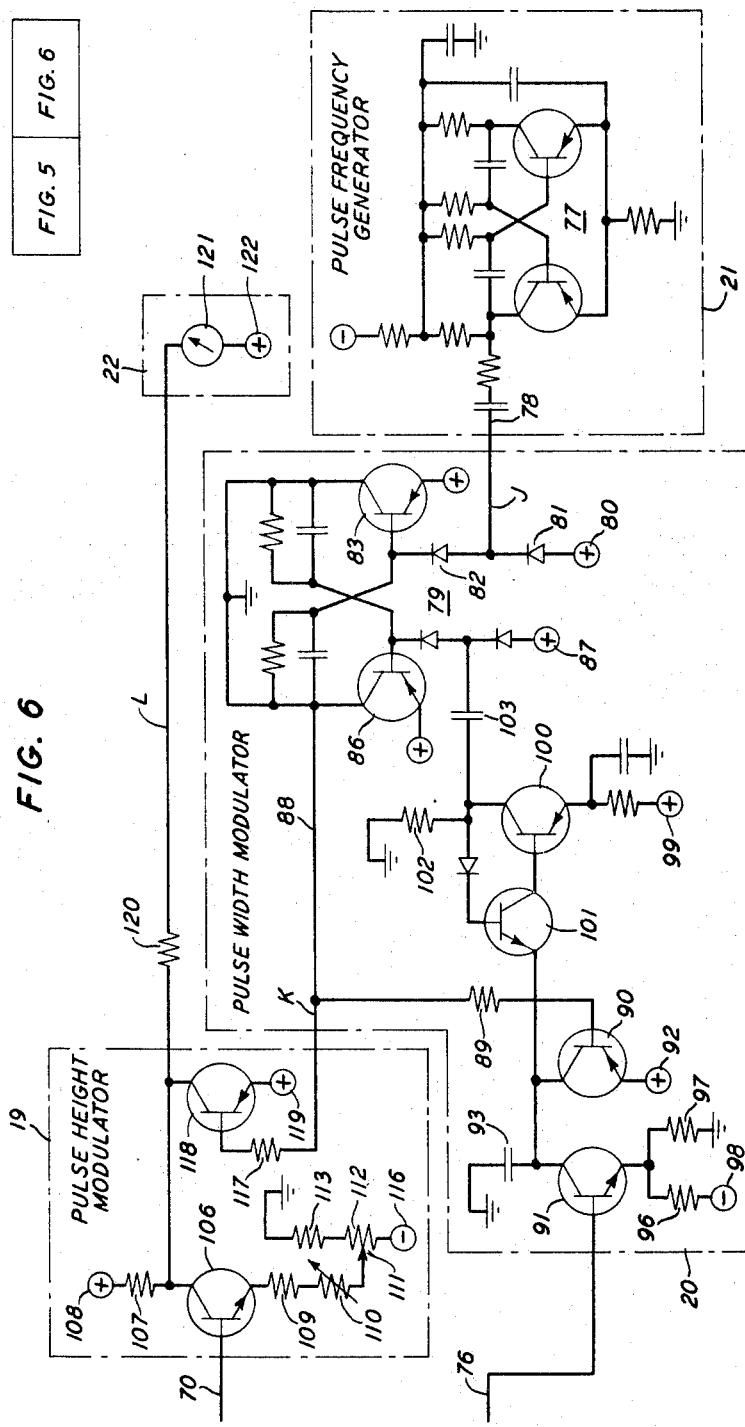

United States Patent Office 3,391,249
Patented July 2, 1968

3,391,249
CIRCUIT FOR MEASURING TELEGRAPHIC SIGNAL IMPAIRMENT
Floyd K. Becker, Colts Neck, and Dieter M. P. Eisenlohr, Middletown, N.J., assignors to Bell Telephone Laboratories, Incorporated, New York, N.Y., a corporation of New York
Filed May 21, 1964, Ser. No. 369,082
12 Claims. (Cl. 178—69)

ABSTRACT OF THE DISCLOSURE

A system is disclosed in which a data signal is rectified and sampled at appropriate sampling times. First and second control signals are generated proportional to the maximum and minimum amplitudes of the data samples. The first control signal determines the duration of pulses provided by a pulse generator while the second control signal determines the amplitude thereof. The average value of the pulse is displayed to indicate the quality of the data signal.

---

This invention relates to a circuit for indicating transmission characteristics of a telegraphic type of signal wave.

It is known in the art to judge the quality of the signal transmission of a selected transmission line as a function of the size of the aperture, or eye, which is formed by superimposed sequences of telegraphic signals received from such line. This type of evaluation is disclosed and claimed in one form in the D. L. Favin United States Patent 3,041,540, granted June 26, 1962. Eye pattern evaluation takes into account the fact that certain types of distortion in a transmission system cause asymmetrical alteration of a binary pulse waveform. Such alteration reduces the size of the signal wave eye, and, consequently, increases the difficulty of accurately detecting information content of the wave.

In prior art circuits which have been utilized to evaluate signal transmission in terms of signal eye patterns there were a number of limitations. Some such circuits utilize oscilloscope methods, and an attendant is required to observe and interpret eye patterns appearing on the oscilloscope screen. Continuous surveillance of the screen is essential to the practice of the oscilloscope methods, and a certain amount of experience is required for each individual attendant to be able to judge the relationship between a particular trace and the corresponding anticipated information detection fidelity. There are other systems in the prior art which evaluate transmission in terms of eye patterns by counting selected signal samples in predetermined magnitude ranges in a variable time slot and over a predetermined time interval. This latter type of arrangement gives numerical indications of system transmission quality, but such indications must be related to the amplitude and time ranges employed in order for one to be able to translate the results into any indication of system performance.

It is therefore one object of the present invention to indicate the quality of telegraphic signal transmission by measuring received signal conditions in accordance with an improved measuring technique.

It is another object to measure the quality of signal transmission in terms of the potential detection fidelity which would be possible with the signal independently of symmetrical alterations in the signal wave.

Still another object of the invention is to indicate the quality of signal transmission in terms of a ratio of minimum signal eye opening to maximum eye opening over a time interval of recent signal transmission.

These and other objects of the invention are achieved in an illustrative embodiment thereof in which received telegraphic signals are full wave rectified, and positive and negative versions of the rectified signal wave are recurrently sampled. Two separate control voltages are produced in response to the two sets of samples, respectively; and the control voltages are employed separately to modulate the amplitude and width of pulses in a train of pulses. The average value of the modulated pulses is measured as an indication of the extent of deviation of eye opening from the theoretical optimum eye opening.

It is one feature of the invention that the signal eye measurements achieved are independent of transmission effects that are the same for every information bit, but the measurements are dependent upon transmission effects that alter corresponding bits differently.

It is another feature of the invention that an incoming signal is rectified and applied to a signal inverter which produces two versions of the rectified signal of opposite polarity. The use of these two versions makes it possible to utilize similar signal sample storage circuits for storing both maximum and minimum sample excursion information.

Still another feature is that a substantially noninductive rectifier circuit is employed so that high bit rates can be accommodated.

A further feature is that the control voltages are developed so that the height and width of pulses in the pulse train are modulated to make a modulated pulse train with an average value that is a function of the ratio of input telegraphic signal eye minimum opening to maximum opening.

Still another feature is that two separate circuits utilizing the same circuit elements differently biased are employed to develop the control voltages representing maximum and minimum input signal excursions.

A more complete understanding of the invention may be derived from a consideration of the following detailed description of an illustrative embodiment thereof when taken in connection with the appended claims and the accompanying drawing in which:

FIGS. 5 and 6, when combined as indicated in the diagram of FIG. 7, represents a schematic diagram of the embodiment of FIG. 3.

The present invention is useful for evaluating signal transmission in any system wherein signal detection fidelity is a function of input signal pulse amplitudes with respect to a preselected reference voltage level. The description presented herein, however, is framed in terms of the application of the invention to a data receiving set for binary coded signal pulses. It is assumed that positive pulses in the input signal represent binary ONE information bits, and negative input pulses represent binary ZERO information bits. A typical signal wave of this type has sinusoidal characteristics; and in fact, a series of sequential bits comprising alternate ONES and ZEROS has the appearance of a sine wave.

Figure 1:
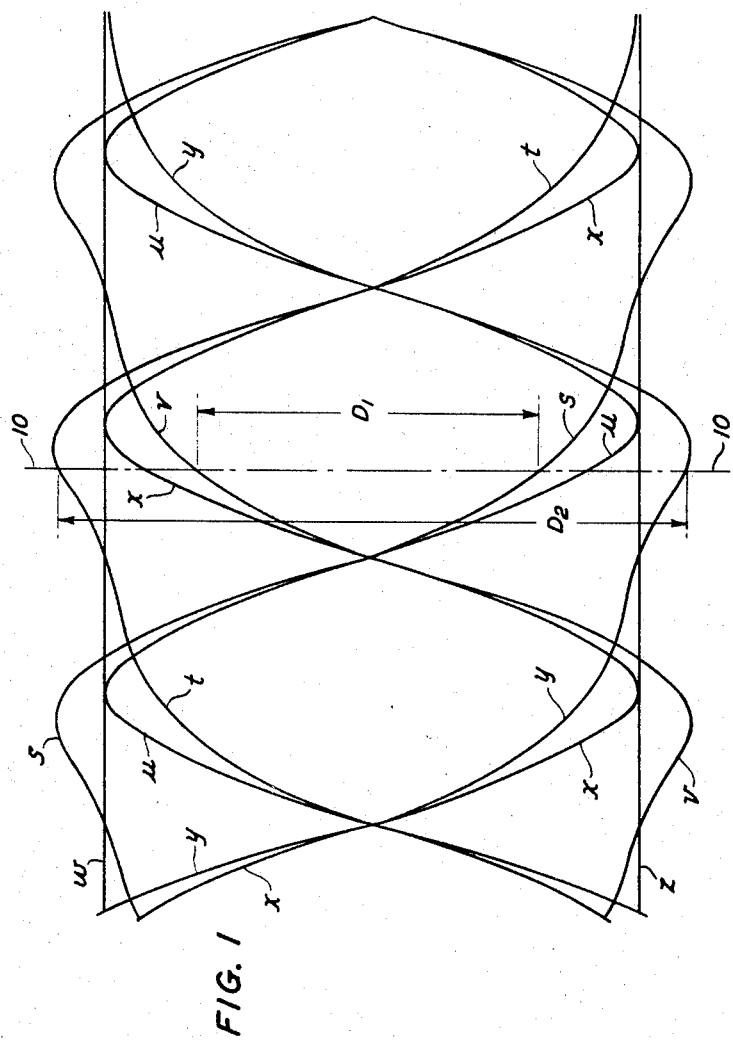
FIG. 1 is a diagram of a typical telegraphic signal eye pattern.

FIG. 1 is a diagram of superimposed data signal traces as they appear on the screen of an oscilloscope connected to receive a demodulated data signal. It is to be understood, however, that the traces which appear to be superimposed on the oscilloscope screen are, in fact, sequentially occurring portions of the received data signal. FIG. 1 shows traces of eight superimposed four-bit sequences with only a part of the first bit in each sequence appearing. It is not possible to tell the order in which the sequence traces occurred, but the order of bits in each sequence is apparent. Thus, traces $s$ is a 1–1–0–0 sequence, trace $t$ is a 0–1–1–0 sequence, trace $u$ is a 0–1–0–1 sequence, trace $v$ is a 0–0–1–1 sequence, trace $w$ is four successive ONES, trace $x$ is a 1–0–1–0 sequence, trace $y$ is a 1–0–0–1 sequence, and trace $z$ is four successive ZEROS.

It is well known in the art that a data signal can be considered with reference to a time base divided into sequential time slots corresponding to sequential information bits of the data signal. The sampling of the data wave is controlled in accordance with the time base and advantageously causes each bit to be sampled midway in the bit time slot. In FIG. 1 a vertical broken line 10 has been drawn through a portion of the diagram at a point representing a typical signal wave sampling time. The resulting samples are then examined in the data set to distinguish between ONE and ZERO bits. Accordingly, the sampling time is a meaningful time to examine the data wave to determine the characteristics of the data wave eye and thus determine the possible degree of fidelity of binary ONE-ZERO detection for that wave. The dimensions $D_1$ and $D_2$ shown in FIG. 1 represent the minimum eye opening and the maximum possible eye opening, respectively, for the ilustrated eye pattern. In other words, for the illustrated pattern it is unlikely that there would be any data signal sample peaks at the time slot line 10 within the voltage range $D_1$. The voltage range $D_2$ for the same sampling line 10 indicates the maximum potential eye for the illustrated pattern, but that maximum is realized only infrequently because it is obvious that there will be numerous data sample peaks lying within the randge $D_2$, but outside the range $D_1$ for different information bits.

Figure 2:
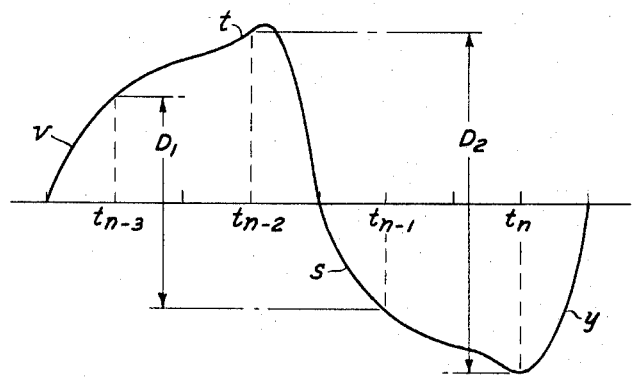
FIG. 2 is a wave diagram of certain parts of the eye pattern diagram in FIG. 1.

FIG. 2 represents an artificial signal wave sequence which includes four data signal trace portions extracted from the pattern of FIG. 1 to produce in sequence the four trace portions defining the limits of the ranges $D_1$ and $D_2$ in FIG. 1. The portions are from traces $v$, $t$, $s$, and $y$. Thus, the trace of FIG. 2 represents a data sequence including two binary ONES followed by two binary ZEROS. Information bit sampling times $t_{n-3}$ through $t_n$ are indicated at the midpoints of the four successive information bit time slots in the diagram of FIG. 2. This representation of FIG. 2 and the indicated sampling times will be utilized subsequently in describing the details of an embodiment of the invention.

Figure 3:
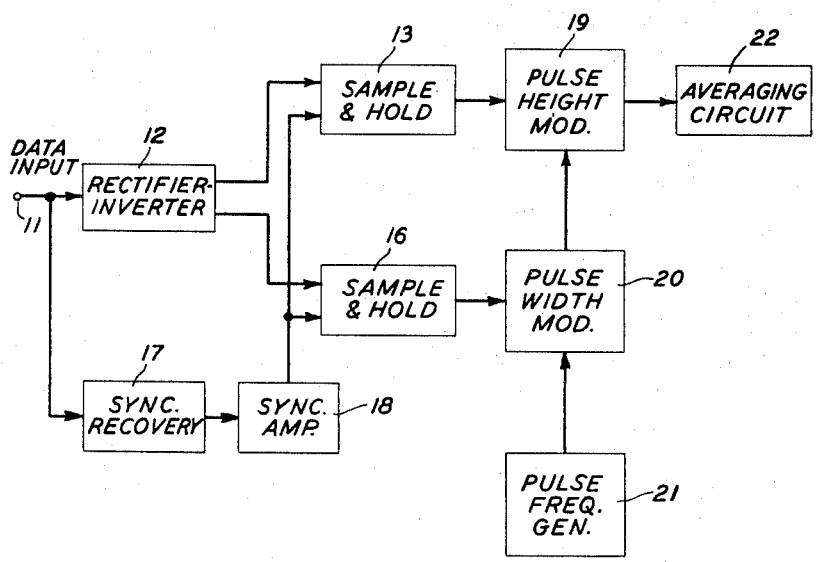
FIG. 3 is a block and line diagram of one embodiment of the invention.

The block and line diagram of FIG. 3 illustrates in general form the embodiment of the invention which is to be discussed herein. This embodiment is represented in the framework of a data receiving set, as hereinbefore noted. The purpose of the circuit of FIG. 3 is to derive a signal which is a function of the ratio of the minimum eye opening $D_1$ to the maximum eye opening $D_2$. This signal may be utilized in any desired fashion. One use is to indicate the magnitude of such signal to an attendant who will know on the basis of his experience whether or not the ratio indicated by the signal is one at which the particular data receiving set can satisfactorily detect the information content in the signal.

The data input signal is supplied from a transmitter (not shown) to the data set of FIG. 3 and appears at input terminal 11 after demodulation. The transmission medium between the transmitter and the data receiving set is advantageously any suitable data transmission connection such as an ordinary telephone communication line (not shown). The form of the input signal is an alternating current signal of the type illustrated in FIG. 2, but including various permutations of binary ONES and ZEROS to convey the desired information. A rectifier-inverter circuit 12 rectifies the incoming signal and derives from the rectified signal positive and negative versions thereof which are coupled to input connections of two sample and hold circuits 13 and 16, respectively. The data input signal is also coupled to a synchronizing signal recovery circuit 17 which derives a cyclic timing wave from the data signal. The timing wave is used to control the data set circuits. Various synchronizing signal recovery circuits are known in the art, and one such circuit is disclosed and claimed in the D. L. Favin Patent 3,041,540.

A synchronizing signal amplifier 18 applies the synchronizing signals to additional input connections of the sample and hold circuits 13 and 16 so that such circuits operate simultaneously to sample their respective negative and positive versions of the rectified input signal. Each of the sample and hold circuits 13 and 16 develops a control signal that is indicative of a different eye characteristic. The circuit 13 develops at its output connection a substantially continuous direct-current signal which is a function of the minimum eye opening that would appear on an oscilloscope screen if successive portions of the data signal were superimposed as shown in FIG. 1. Similarly the circuit 16 is biased to produce a negative direct-current signal which is a function of the maximum eye opening for the same eye pattern.

The two negative control signals from the sample and hold circuits 13 and 16 are applied to modulators 19 and 20. In the modulator 20 the width of pulses in a pulse train, supplied by a pulse frequency generator 21, is modulated in accordance with the magnitude of the negative signal from the circuit 16. Output pulses from the modulator 20 are further subjected in the modulator 19 to height modulation in accordance with the magnitude of the negative control signal from the circuit 13. Output pulses from the height modulator 19 control the operation of an averaging circuit 22 which produces an indication of the average value of the train of modulated pulses. As will be described subsequently, the control signals are developed so that the average signal indication at circuit 22 is a function of the ratio of the minimum eye opening to the maximum eye opening.

Thus, changes in the degree of distortion of the input signal wave to the data set cause corresponding changes in the ratio of minimum to maximum eye opening. However, straightforward changes in gain or attenuation affect both the minimum and maximum eye openings proportionately and produce no significant change in the eye ratio indicated by the averaging circuit 22.

Figure 4:
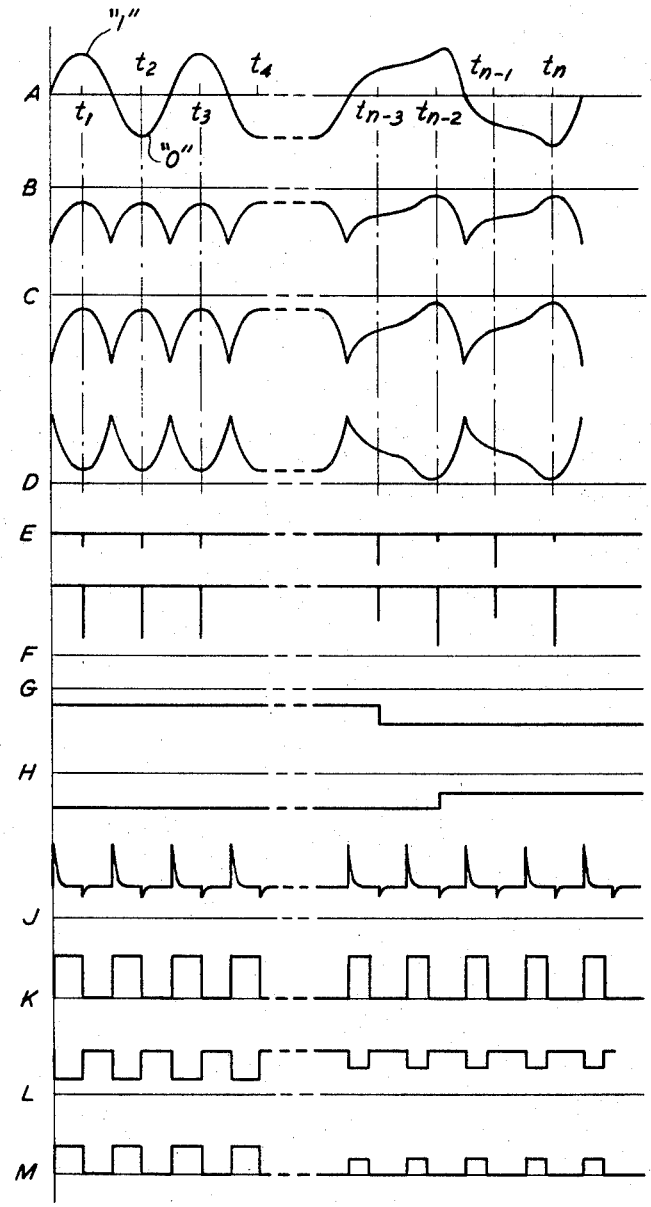
FIG. 4 is a timing diagram of voltage waves illustrating the operation of the invention.
Figure 5:
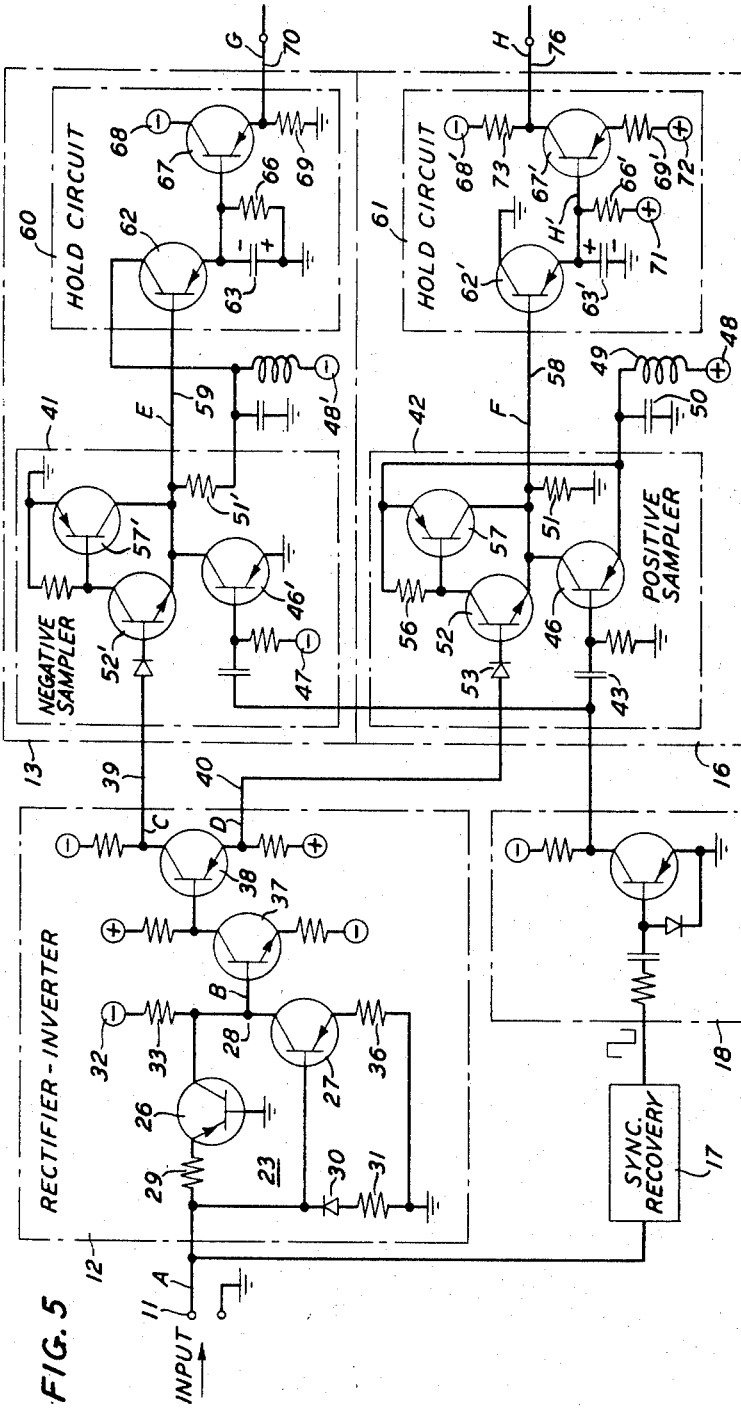

FIG. 4 includes wave diagrams indicating the previously described operation of the invention in connection with the schematic diagram of FIGS. 5 and 6. Alphabetic characters have been used in FIG. 4 to designate particular wave diagrams, and corresponding characters are shown in FIGS. 5 and 6 to indicate the location in the circuit at which the illustrated voltage conditions prevail. In the diagrams A through F of FIG. 4, the first four time slots represent the wave trace produced in response to alternate ONES and ZEROS in the data input wave A. These four information bits are illustrated as approximations of a theoretically perfect input signal with no distortion. The fifth time slot is shown by broken lines to indicate a time interval of any length during which an attendant switches the illustrated data set from an input line having the theoretically perfect signal to a line which is transmitting a signal including various types of distortion. Successive time slots of this latter signal are illustrated in the right-hand portion of each wave diagram. The distorted input signal there illustrated corresponds with that shown in FIG. 2. Sampling times are indicated on the wave diagram A of FIG. 4 by the reference characters $t_1$ through $t_n$ at the midpoints of corresponding successive time slots.

In FIG. 5 the input signal at terminal 11 is applied to a transformerless, transistor, rectifier circuit 23 in the rectifier-inverter 12. The rectifier circuit 23 includes two PNP transistors 26 and 27 which have their collector electrodes connected to a common terminal 28. The base electrode of transistor 27 is connected to input terminal 11 and is also connected through a resistor 29 to the emitter electrode of transistor 26. The base electrode of the latter transistor is grounded. A diode 30 and a resistor 31 are connected in series between the base electrode of transistor 27 and ground to present to input terminal 11 substantially the same input impedance when transistor 27 is conducting as is presented to that terminal when transistor 26 is conducting. The two transistors are so biased that they conduct alternatively and not concurrently. A negative source 32 of operating potential is connected through a resistor 33 to the collector electrode of transistor 27. The emitter electrode of that transistor is returned through a resistor 36 and ground to the other terminal of the source 32.

Source 32 is schematically represented by a circled minus sign which indicates a direct potential source having its negative terminal connected to the circuit point indicated by such schematic representation and having its positive terminal connected to ground. This same schematic notation is utilized throughout FIGS. 5 and 6, and a positive sign in the circle indicates a source with its positive terminal connected to the indicated circuit point and its negative terminal grounded. Any suitable arrangement of sources is satisfactory, and in the illustrated embodiment all of the negative sources are advantageously connected to a common bus not shown and all of the positive sources are similarly connected to a positive bus not shown.

The signal waveform at the terminal 28 in FIG. 5 is the wave B in FIG. 4 and includes the full-wave rectified input signal in the form of positive-going negative pulses. Such pulses advantageously have their zero reference at the negative supply voltage. For practical purposes here, and throughout the circuit description, the junction voltage drops of the transistors are neglected. These signal pulses are coupled by a buffer amplifier stage including a transistor 37 to the base electrode of a transistor 38 which is connected in a signal inverting circuit. Two versions of the rectified signal are produced by the inverting circuit. At the collector electrode of transistor 38 the signal appears as shown in wave C of FIG. 4 and includes positive-going negative pulses, i.e., pulse peaks are at the least negative values of the pulses corresponding to input signal excursions at terminal 11. At the emitter electrode of transistor 38 the second version, wave D, of the rectified signal appears and includes negative-going positive signal pulses. The pulse peaks of wave D are the least positive portions of the pulses corresponding to input signal excursions at terminal 11.

Leads 39 and 40 couple the waves C and D to sampling circuits 41 and 42, respectively, in sampling and hold circuits 13 and 16. The two sampling circuits are basically of the same type but are differently biased to facilitate their operation in conjunction with their respective negative and positive input signals. Since the samplers 41 and 42 are similar, only one need be described in detail.

Each sampler receives positive sampling pulses from the synchronizing signal amplifier 18. Such sampling pulses are coupled by a capacitor 43 in sampler 42 to the base electrode of a PNP transistor 46. That transistor is biased to be normally conducting in the absence of such pulses so that the transistor 46 acts as a clamp on the remainder of the sampling circuit to render such circuit inoperative. The base electrode of transistor 46 is connected to ground through a resistor, and the emitter electrode of that transistor is connected to a positive source 48 through a decoupling circuit including a coil 49 and a capacitor 50. The collector electrode of transistor 46 is connected to ground through a resistor 51, and it is also connected to the emitter electrode of an NPN transistor 52 which receives at its base electrode, and through a diode 53, the positive wave D. The collector electrode of transistor 52 is coupled through a resistor 56 to the same positive source 48. A PNP transistor 57 has its base-collector junction connected between the collector and emitter of transistor 52 and has its emitter-base junction connected across resistor 56. This connection of transistor 57 decreases the output impedance of transistor 52 which is presented to the hold circuits to be described.

The input wave D is always positive, but it is never more positive than the potential of source 48. Accordingly, transistor 52 is held in a nonconducting condition as long as transistor 46 is conducting. Each positive-going synchronizing pulse from amplifier 18 biases transistor 46 to the nonconducting condition thereby permitting transistors 52 and 57 to conduct, and produce on lead 58 samples of the wave D as illustrated in the wave F of FIG. 4.

The circuits of sampler 41 are substantially the same as those of sampler 42 except for the bias voltages employed. Thus, in sampler 41 the base electrode of transistor 46' goes to a negative source 47 through a resistor instead of to ground. The emitter electrodes of transistors 46' and 57' go to ground instead of to the positive potential. Resistor 51' is connected from the emitter electrode of transistor 52' to a negative potential source 48' instead of to ground. Since the wave C is always negative, transistor 52' is held nonconducting until a positive-going synchronizing pulse blocks conduction in transistor 46'. At that time transistor 52' is drawn into conduction to apply to a lead 59 a sample of the wave C as illustrated in the wave E of FIG. 4.

It is convenient to note at this point that the wave sample in diagram F represents directly the magnitude of the rectified data signal pulse at the time of sampling. The samples of wave F are negative-going excursions in the sample wave envelope and their zero reference is at the positive source voltage. The wave samples in diagram E, on the other hand, correspond to what might be considered the complement of the magnitude of the rectified data wave. The inverter output waves C and D represent the rectified signal with its zero value direct-current shifted to predetermined different relationships with respect to ground reference so that ground is, in a sense, outside the shifted wave envelope. This relationship between signal wave and sample is evident from a comparison of waves C and D with waves E and F, respectively, in FIG. 4. The utility of this type of sampling will become apparent in connection with the subsequent discussion of the hold circuit portions in the sample-and-hold circuits 13 and 16.

The hold circuits 60 and 61 in the sample-and-hold circuits 13 and 16 are of substantially the same configuration but have different biasing arrangements. Thus, the circuit 60 is adapted to produce a control voltage which is a function of the minimum eye opening, and this is done by storing the value of the largest negative samples in wave E. A PNP transistor 62 has its emitter electrode connected to ground through a holding capacitor 63. A resistor 66 shunts capacitor 63. The samples in wave E are applied to the base electrode of transistor 62 and draw the transistor into conduction each time that a sample appears which is more negative than the charge voltage appearing across capacitor 63. The transistor conduction charges capacitor 63 more negatively, and conduction continues until there is insufficient forward bias on the transistor 62 base-emitter junction.

The voltage appearing across the capacitor 63 controls the conduction level of a transistor 67 which has its collector electrode connected to a negative source 68 and its emitter electrode connected to ground through a resistor 69. The time constant of the discharge circuit of capacitor 63 through resistor 66 and through resistor 69 and transistor 67 is advantageously arranged so that the charge on the capacitor remains substantially constant for a period of one tenth of a second. That period represents for one practical data system a convenient compromise between indicator sensitivity to change and permissible system error rate. The bias developed by the change on capacitor 63 is sufficient to keep transistor 67 in a conducting condition at all times. Thus a continuous negative control voltage is developed across resistor 69 and is coupled by the lead 70 to the pulse height modulator 19 in FIG. 6. This control voltage is illustrated in the diagram G of FIG. 4.

The hold circuit 61 in sample-and-hold circuit 16 is similar to that of hold circuit 60, but the bias arrangements are different. Circuit 61 stores voltages which represent the largest sample pulse excursions in wave F. The smallest of such voltages represents the largest negative-going excursion in wave F and is used to develop a control voltage that is a function of the maximum eye opening. Resistors 66' and 69' are connected to positive sources 71 and 72, respectively, instead of being connected to ground. The collector electrode of transistor 67' is connected to a negative source 68' through a resistor 73. With this arrangement the transistor 62' conducts whenever an input sample in wave F is less positive than the charge voltage appearing at that time across the capacitor 63'. A continuous negative voltage is developed across the resistor 73 and is coupled by the lead 76 to the pulse width modulator 20 of FIG. 6.

At this point it is advantageous to know the influence upon the control voltages represented by waves G and H of changes in the input signal between the left-hand half of FIG. 4 and the right-hand half of FIG. 4. In the theoretically perfect part of waveform A in the left-hand half of FIG. 4, the ONES and ZEROS are of the same magnitude but of opposite polarity. In the right-hand half of wave E in FIG. 4 the wave samples at times $t_{n-3}$ and $t_{n-1}$ are much larger than the samples taken at sampling times $t_{n-2}$ and $t_n$. These differences in sample size reflect the fact that the two illustrated ONES sampled at times $t_{n-3}$ and $t_{n-2}$ have different magnitudes, and the two illustrated ZEROS sampled at times $t_{n-1}$ and $t_n$ have different magnitudes.

If it is assumed that a long succession of pairs of ONES and ZEROS, as shown in the left-hand part of wave A, had been received just prior to time $t_{n-3}$, a certain negative charge is stored on capacitor 63 in hold circuit 60. Recalling the preceding discussion of the operation of the hold circuits, the first distorted wave sample, at time $t_{n-3}$, in wave E is larger than any previous sample and represents a decrease in the minimum eye opening. This larger sample draws transistor 62 into conduction. Capacitor 63 is rapidly charged to a larger negative voltage which causes transistor 67 to conduct harder than it had at times $t_1$ through $t_4$ thereby producing on lead 70 a more negative control voltage than had been there presented during the time of occurrence of the theoretically ideal data wave.

In other words, the control voltage on lead 70 becomes more negative in response to a decrease in the minimum eye opening. It follows also from the circuit operation described that the voltage on lead 70 becomes less negative in response to an increase in the minimum eye opening. However, a change of the latter type takes place over a time interval including plural samples because it is accomplished by the discharge of capacitor 63 through resistor 66 to a less negative voltage level.

Considering now the hold maximum circuit 61, the positive samples of wave F, corresponding to the negative-going excursions of the envelope of that wave, are applied to the transistor 62' in the hold circuit 61. The sample pulse at time $t_{n-2}$ is the first effective sample of the distorted data wave insofar as circuit 61 is concerned, and that sample represents a change in the eye maximum. The distortion illustrated in FIG. 4A increases the maximum data wave excursion and causes the wave F envelope excursion at time $t_{n-2}$ to be larger than any previous illustrated excursion. In other words, the corresponding sample is smaller than any preceding sample. Transistor 62' is drawn into conduction by the smaller sample and rapidly discharges the capacitor 63' to the level of the sample. Thus, a small positive charge is held on capacitor 63', such charge being smaller than that previously stored there when the theoretically ideal data wave was being received. Consequently, transistor 67' conducts harder in response to the distorted signal than it had in response to the ideal signal. The higher level of current flow through resistor 73 drives the collector electrode of transistor 67', and thus the lead 76, to a less negative voltage.

The voltage on lead 76 becomes less negative in response to an increase in the maximum eye opening. Similarly, that voltage becomes more negative in response to a decrease in the maximum eye opening. However, the latter type of change takes place more slowly at a rate dictated by the time constant of capacitor 63' and resistor 66'.

Thus, the distorted data wave produces a smaller minimum eye opening and a larger maximum eye opening and thus should produce an output indication representing a smaller ratio of eye minimum to maximum. The larger negative control voltage G and the smaller negative control voltage H, representing the distorted data signal conditions shown in FIG. 4A, are applied by the leads 70 and 76 of FIG. 5 to the modulators 19 and 20 of FIG. 6 as was previously described in connection with FIG. 3. These voltages control the production of the smaller eye ratio indication as will now be described.

In FIG. 6 the pulse frequency generator 21 includes a free-running multivibrator 77 which supplies a continuous train of positive-going pulses. These pulses are differentiated and applied by a lead 78 to the pulse width modulator 20. The differentiated pulse wave is illustrated in the wave J of FIG. 4, and the positive-going impulses therein are there shown as occurring at the bit rate of the incoming data signal for convenience in illustrating the pulse wave. The controlling factor on the lower limit of the frequency of these pulses, however, is the time constant of the averaging circuit 22. The pulses from the generator 21 must occur at a sufficient frequency to produce a stable indication in the particular form of averaging circuit 22 which is employed. It is advantageous, however, to hold the frequency significantly lower than the data signal sampling rate.

In the modulator 20 the pulses of wave J are applied to a bistable multivibrator circuit 79 through a diode coupling circuit which includes a positive potential source 80 and two series-connected diodes 81 and 82. The multivibrator 79 includes two PNP transistors 83 and 86 which are cross-coupled for bistable operation in a conventional manner. The cathode terminal of diode 82 is connected to the base electrode of transistor 83. A positive potential source 87 is similarly connected in a diode coupling circuit to the base electrode of transistor 86. Each positive pulse on the lead 78 sets multivibrator 79 by blocking conduction in transistor 83 and thereby transferring conduction to transistor 86. The transfer produces at the collector electrode of the latter transistor a positive potential. A lead 88 and a resistor 89 couple the positive potential from transistor 86 to the base electrode of a transistor 90 to block conduction in the latter transistor.

The transistor 90 had been normally conducting, in the absence of positive voltage from the multivibrator 79, to clamp the collector electrode of an NPN transistor 91 at the positive potential of a source 92. Thus, in the absence of positive pulses from multivibrator 79 a capacitor 93 connected between that same collector electrode of transistor 91 and ground is charged to the positive potential of source 92. Transistor 91 conduts at a level which is determined by the magnitude of the negative control voltage on the lead 76, which is connected to its base electrode, and by the bias potential on its emitter electrode. The latter potential is fixed by a potential divider including resistors 96 and 97 which are connected between ground and a negative potential source 98.

A positive voltage from multivibrator 79 blocks conduction in transistor 90. Transistor 91 then draws its collector current from capacitor 93 and discharges that capacitor. The discharge rate depends upon the conduction level in transistor 91 which increases and decreases with corresponding changes in the negative amplitude of the control voltage on lead 76. Accordingly, the discharge rate is proportional to the magnitude of the maximum eye opening. When capacitor 93 has been discharged to ground a pair of hook-connected transistors 100 and 101 are drawn into conduction and recharge capacitor 93 toward the potential of source 92. At the same time a positive potential difference is developed across a resistor 102. This positive potential is coupled by a capacitor 103 to the base electrode of the transistor 86 in multivibrator 79 and triggers that multivibrator to transfer conduction from transistor 86 back to transistor 83. The latter transfer terminates the positive voltage on lead 88 and permits transistor 90 to conduct once more to re-establish the positive clamp on the collector electrode of transistor 91.

The conducting condition prevails in transistor 91 until another pulse from the generator 21 triggers the multivibrator 79 to initiate the modulator operating cycle once more. Thus, the width of the output pulse on lead 88 from the modulator 20 is a function of the length of time during which the multivibrator 79 remains in its set condition, and that time is controlled by the conducting level of transistor 91 under the influence of the negative control voltage on lead 76. The previously described smaller negative control voltage for the distorted data signals causes transistor 91 to conduct at a higher level thereby discharging capacitor 93 more rapidly and decreasing the duration of each output pulse from the modulator 20.

In the pulse height modulator 19 an NPN transistor 106 is arranged to be normally conducting in response to a negative control voltage applied by lead 70 to its base electrode. The collector electrode of transistor 106 is connected through a resistor 107 to a positive potential source 108. Resistors 109 and 110 are connected in series from the emitter electrode of transistor 106 to a tap 111 on a potential divider which includes resistors 112 and 113 connected between ground and a negative potential source 116. The tap 111 is adjusted to place the emitter electrode of transistor 106 at a potential which is always more negative than any potential appearing on lead 70 to assure continuous conduction in the transistor.

The positive pulses of varying widths from the modulator 20 are coupled through a resistor 117 to the base electrode of a transistor 118 in modulator 19. Transistor 118 is connected to clamp the collector electrode of transistor 106 to the potential of a positive source 119 whenever transistor 118 is conducting. The pulses from the modulator 20 block conduction in transistor 118 and permit the potential at the collector electrode of transistor 106 to shift to a lower level fixed by the conducting condition in the transistor as a function of the negative control potential on the base electrode thereof. Thus, the potential at the collector electrode of transistor 106 varies as shown in the wave diagram L of FIG. 4 between a first positive potential corresponding to the output of source 119 and a lower positive potential fixed by normal conduction in the transistor 106 in the absence of the clamping effect. The wave L is a series of negative-going pulses with a positive reference, having widths controlled by modulator 20, and having negative-going amplitudes controlled by modulator 19. The average value of such amplitudes is a function of the data wave eye ratio.

The varying positive potential at the collector of transistor 106 is applied by a resistor 120 to the averaging circuit 22 which advantageously includes a current-responsive meter 121 and a positive potential source 122. As was previously noted, the positive potential sources 122, 108 and 119 are advantageously connections to the same positive potential bus. Under such conditions a zero potential difference is applied to the circuit of meter 121 when the clamp transistor 118 is conducting and no current flows. However, when transistor 118 is nonconducting in response to pulses from the modulator 20, the circuit of meter 121 is subjected to the potential difference between the source 122 and the collector electrode of transistor 106, and a current flows. These potential differences on the meter circuit are illustrated in the wave diagram M of FIG. 4. Assuming, as previously noted, that the pulses from generator 21 are occurring with sufficient frequency to produce a stable indication on meter 121, the meter will indicate the average value of the current and produce a higher indication for the theoretically perfect data signal wave than is produced in response to the smaller pulses in wave M resulting from the distorted data signals. Thus, distorted signals produce a smaller minimum eye opening, a larger maximum eye opening, or both. Consequently, a smaller indication is produced in the averaging circuit 22 than is produced by the theoretically perfect data signals.

It was previously noted that the control voltage on lead 70 was more negative for distorted signals that reduced the minimum eye opening than for undistorted signals. Such distorted signals produce some larger negative sampled in wave E than did the undistorted signals, and those larger samples drive transistor 67 harder to produce on lead 70 a larger negative control voltage. This larger negative control voltage causes transistor 106 to conduct at a lower level in response to the distorted data signals and thereby causes the voltage at the collector electrode of that transistor to be more positive in the absence of clamping than is the case for the undistorted data signals. This larger potential at the collector electrode of transistor 106 for the unclamped condition means a smaller potential difference between the clamped and unclamped conditions and a smaller average value of voltage applied to the meter 121.

Signal distortion may also cause a larger maximum eye opening which in turn results in larger negative excursions in the wave F. Those excursions cause transistor 67' to be driven harder to produce a smaller negative control voltage at its collector electrode. This smaller control voltage drives transistor 91 harder and narrows the output pulses from modulator 20. Consequently, the meter produces a lower indication for the distorted signals than for undistorted signals, as previously described.

It will be observed that for the theoretically perfect input data wave the maximum and minimum eye openings are the same. If attenuation or gain is added to affect the incoming wave in a symmetrical fashion, the control voltages on leads 70 and 76 become more negative or less negative in response to smaller or larger minimum and maximum eye openings. Assume for example, that attenuation causes a smaller input wave which produces larger negative excursions at the input to hold circuit 60. The control voltage on lead 70 becomes more negative and causes the pulses of wave M to be of smaller magnitude. However, the negative excursions at the input to hold circuit 61 are smaller and cause a more positive control voltage at the base electrode of transistor 67' in FIG. 5. The conduction level of transistor 67' is reduced and makes the control voltage on lead 76 more negative. Transistor 91 conducts at a lower level and causes the pulses of wave M to be wider thereby offsetting the effect on the average of the reduction in pulse height. Taller pulses of a proportionately narrower configuration would be the result on wave M of gain that causes input wave A to be symmetrically larger. Consequently, a symmetrical change in the input wave produces no change in the eye ratio indication.

Although this invention has been described in connection with a particular embodiment thereof it is to be understood that additional embodiments and modifications which will be obvious to those skilled in the art are included within the spirit and scope of the invention.

What is claimed is:
1. In combination:
   means receiving a signal wave having signal excursions of different magnitudes at a predetermined time slot of each excursion, and means deriving from said signal wave a further signal having an average value which is a function of the ratio of the least magnitude of said excursions to the greatest magnitude of said excursions.

2. A signal quality indicating circuit comprising:
means receiving a signal wave including signal excursions of varying magnitude,
means deriving from said signal wave a first control signal having an amplitude which changes more rapidly for an increase in excursion magnitude than for a decrease in excursion magnitude,
means deriving from said signal wave a second control signal having an amplitude which changes more rapidly for a decrease in excursion magnitude than for an increase in excursion magnitude,
a source of pulses of substantially uniform frequency and configuration,
means modulating the amplitude of said pulses as a function of one of said control signals and the width of said pulses as a function of the other of said control signals, and
means indicating the average voltage of said pulses after modulation.

3. A signal transmission indicator comprising:
means receiving input signals,
means recurrently sampling voltage excursions of said signals at predetermined time intervals,
means storing indications of maximum and minimum output signal excursions of said sampling means,
a pulse generator,
first means modulating the output of said generator with said minimum sampling signal indication,
second means modulating the output of the first-mentioned modulating means with said maximum sampling signal indication, and
means indicating the average value of the output of said second modulating means.

4. The signal transmission indicator in accordance with claim 3 in which said receiving means includes a noninductive full wave rectification circuit comprising:
a commond terminal,
first and second transistors connected to couple input signals of opposite polarities, respectively, to said common terminal with the same polarity,
signal inverting means coupled to said common terminal and having two output connections at which positive and negative versions, respectively, of the full wave rectified input signal are produced, and
means coupling said output connections to said sampling means.

5. The signal transmission indicator in accordance with claim 3 in which said first modulating means includes:
an amplifier circuit conducting current of different magnitudes in accordance with the magnitude of said minimum sampling signal indication,
a capacitor and a clamp circuit connected for separately supplying current to said amplifier,
a modulator output connection to said clamp circuit,
means recurrently disabling said clamp circuit to enable the discharge of said capacitor through said amplifier, and
means responsive to a predetermined charge voltage on said capacitor enabling said clamp circuit and thereby producing in said modulator output connection pulses of variable width in accordance with the magnitude of said minimum sampling signal indication.

6. The signal transmission indicator in accordance with claim 3 in which said storing means comprises:
a first storing unit and a second storing unit, each of which includes a capacitor and a switching device connecting such capacitor to an output of said sampling means, and
means separately biasing said switching devices to conduct signals from said sampling means to the corresponding storing unit capacitor in response to a sampling means output voltage which exceeds the charge voltage on said first unit capacitor and which is less than the charge on said second unit capacitor.

7. The signal transmission indicator in accordance with claim 3 in which said storing means comprises:
a sample maximum storing unit and a sample minimum storing unit, each of which includes a capacitor and a switching device connecting such capacitor to an output of said sampling means, and
means separately biasing said switching devices to conduct signals from said sampling means to the corresponding storing unit capacitor in response to a sampling means output voltage which exceeds any charge voltage on said maximum unit capacitor and which is less than any charge on said minimum unit capacitor.

8. The signal transmission indicator in accordance with claim 7 in which said first modulating means includes:
an amplifier circuit conducting current of different magnitudes in accordance with the magnitude of said minimum indication,
a modulator capacitor and a clamp circuit connected for separately supplying current to said amplifier,
a modulator output connection to said clamp circuit,
means disabling said clamp circuit whereby said modulator capacitor discharges through said amplifier, and
means responsive to a predetermined charge voltage on said modulator capacitor enabling said clamp circuit thereby producing in said modulator output connection pulses of variable width in accordance with the magnitude of said minimum indication.

9. The signal transmission indicator in accordance with claim 7 in which said receiving means includes a noninductive full wave rectification circuit comprising:
a common terminal,
first and second transistors connected to couple input signals of opposite polarities, respectively, to said common terminal with the same polarity,
signal inverting means coupled to said common terminal and having two output connections at which positive and negative versions, respectively, of signals at said common terminal are produced, and
means coupling said output connections to said sampling means.

10. A signal transmission indicating circuit comprising:
full wave rectification means for receiving input signals,
means deriving from the full wave rectification means a first signal which comprises positive-going negative signal excursions and a second signal which comprises negative-going positive signal excursions,
means recurrently sampling said first and second signals,
separate sample storage circuits connected to said sampling means to receive samples of said first and second signals, respectively,
means controlling a first one of said storage circuits to store only those samples of said first signal which are more negative than any signal already stored therein,
means controlling a second one of said storage means to receive only those samples of said second signal which are less positive than any signal voltage already stored therein,
a pulse source,
means modulating the widths of pulses from said source in accordance with the magnitude of the signal stored in said second storage means,
means modulating the heights of pulses from said width modulating means in accordance with the magnitude of the signal in said first storage means, and
means producing an indication which is a function of the average voltage of the modulated pulse output of the said height modulating means.

11. A signal quality indicating circuit comprising:
means receiving a signal wave, means deriving from said signal wave first and second control signals having amplitudes which are functions respectively of the minimum and maximum opening of the eye of said wave, a source of pulses of substantially uniform frequency and configuration, means modulating the amplitude of said pulses as a function of one of said control signals and the width of said pulses as a function of the other of said control signals, and means indicating the average voltage of said pulses after modulation.

12. A system for measuring the quality of a data signal in which information indicative levels occur at predetermined times in said data signal; said information indicative levels are a first voltage level a first amount greater than a reference level and a second voltage level said first amount less than said reference level, said system including:

means for rectifying said data signal with respect to said reference level to provide a rectified signal, means responsive to said rectified signal for providing a maximum level signal proportional to the maximum value of said rectified signal at said predetermined times, means responsive to said rectified signal for providing a minimum level signal proportional to the minimum value of said rectified signal at said predetermined times, and means responsive to said maximum level signal and said minimum level signal for providing a quality indication signal.

References Cited

UNITED STATES PATENTS 3,225,213　12/1965　Hinrichs et al. _____ 328—135

THOMAS A. ROBINSON, *Primary Examiner.*